United States Patent [19]
Takemoto et al.

[11] Patent Number: 4,832,674
[45] Date of Patent: May 23, 1989

[54] PULLEY AND PRESS-FIT PULLEY STRUCTURE

[75] Inventors: Takashi Takemoto, Sagamihara; Takao Tanishima; Hiromi Yamamoto, both of Tokyo, all of Japan

[73] Assignee: Teac Corporation, Japan

[21] Appl. No.: 152,330

[22] Filed: Feb. 4, 1988

[30] Foreign Application Priority Data

Feb. 18, 1987 [JP] Japan .................. 62-22390

[51] Int. Cl.$^4$ .................................................. F16H 55/00
[52] U.S. Cl. .................................. 474/903; 403/244; 403/368
[58] Field of Search ............... 474/902, 903, 166; 403/272, 283, 301, 367, 368, 362, 370, 263, 244, 242; 29/128, 130, 159 R

[56] References Cited

U.S. PATENT DOCUMENTS

| 119,504 | 10/1871 | Brooks | 474/903 X |
| 2,119,334 | 5/1938 | Leffler | 474/903 X |

Primary Examiner—Thuy M. Bui
Attorney, Agent, or Firm—Andrus, Sceales, Starke & Sawall

[57] ABSTRACT

A pulley adapted to be press-fit on a driving shaft has projections having vertex portions with flat surfaces formed on an inner peripheral surface which is defined by a center hole of the pulley. The flat surfaces of the projections make pressing contact with an outer peripheral surface of the driving shaft at a band-shaped contact area (or surface) extending spirally or concentrically along a longitudinal direction of the pulley.

10 Claims, 4 Drawing Sheets

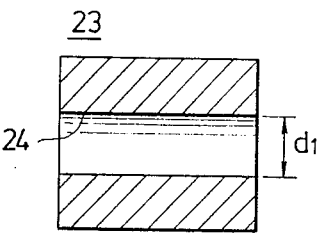
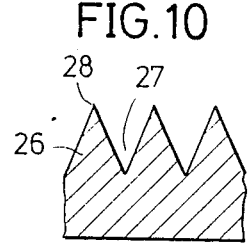
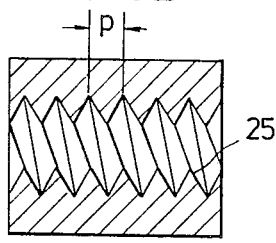
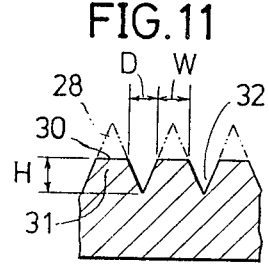
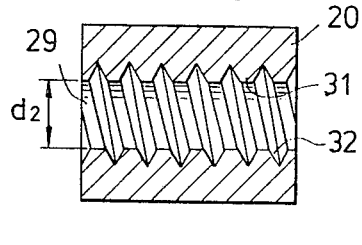
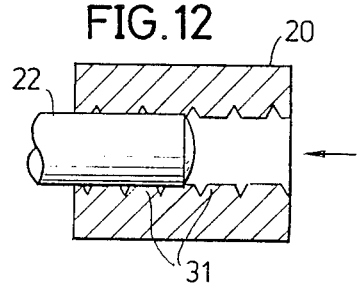

PULLEY AND PRESS-FIT PULLEY STRUCTURE

BACKGROUND OF THE INVENTION

The present invention generally relates to pulleys and pulley structures, and more particularly to a pulley and a pulley structure capable of preventing deformation of an external form of the pulley.

For example, a press-fit pulley structure is used as a capstan of a magnetic tape recording and/or reproducing apparatus and a driving force transmitting member of a magnetic disc recording and/or reproducing apparatus. For convenience' sake, a description will hereunder be given for the latter case.

FIG. 1 generally shows a magnetic disc recording and/or reproducing apparatus (hereinafter simply referred to as an apparatus) employing the conventional pulley structure. In FIG. 1, the apparatus comprises a head seeking motor 11, a head carriage 12, a magnetic head 13 for recording and/or reproducing a signal on and/or from a magnetic disc 14, a pulley 15, a motor shaft 16, and a belt 17. The belt 17 is wrapped around the pulley 15 in the form of the letter alpha, and both ends of the belt 17 are fixed to the head carriage 12.

When the motor 11 is driven and the pulley 15 rotates, the belt 17 is taken up by the pulley 15 to move the head carriage 12 in a direction of an arrow A. As a result, the magnetic head 13 is positioned on a predetermined track T of the magnetic disc 14.

As may be seen from FIG. 1, a deformation of the external form of the pulley 15 directly affects the positioning accuracy of the magnetic head 13, and this positioning accuracy becomes poor when the deformation occurs. This is a serious problem for the apparatus which must carry out a high density recording.

In addition, in the case of the capstan, the deformation of the external form of the capstan directly affects the transport characteristics of the magnetic tape, and an accurate signal recording and/or reproduction cannot be carried out when the deformation occurs.

The pulley 15 is generally fixed on the motor shaft 16 by a press-fitting as shown in FIG. 2. In FIG. 2, M denotes a difference between a diameter of the motor shaft 16 and an internal diameter of a center hole of the pulley 15, that is, an extra thickness, for ensuring a tight fit of the pulley 15 to the motor shaft 16. The pulley 15 employing this press-fit structure must be such that the deformation of the external form of the pulley 15 does not occur easily.

An example of the conventional pulley structure employing the press-fitting is shown in FIGS. 3A and 3B. As shown in FIG. 3A, a pulley 15A is press-fit on the motor shaft 16 for the entire length of the pulley 15A. According to this structure, the extra thickness of the pulley 15A covers the entire length of the pulley 15A, and the external form of the pulley 15A becomes considerably deformed when the pulley 15A is press-fit on the motor shaft 16, as indicated by a solid line in FIG. 3B. In FIG. 3B, a one-dot chain line indicates the external form of the pulley 15A before being press-fit on the motor shaft 16. For this reason, the head positioning accuracy of the apparatus shown in FIG. 1 becomes poor when the pulley 15A is employed.

In addition, the motor shaft 16 is generally made of stainless steel, for example, and the pulley 15A is made of aluminum alloy, for example. The coefficient of thermal expansion of the stainless steel is smaller than that of the aluminum alloy, and the coefficient of thermal expansion differs between the motor shaft 16 and the pulley 15A. Hence, in the case where the apparatus is used at an ambient temperature lower than room temperature, the pulley 15A contracts more than the motor shaft 16. However, since the entire inner peripheral surface of the pulley 15A at the center hole thereof is in close adherence with the outer peripheral surface of the motor shaft 16, the deformation of the pulley 15A caused by the temperature change to the low ambient temperature cannot be absorbed at the inner portion of the pulley 15A and appears at the external portion of the pulley 15A. As a result, the external form of the pulley 15A becomes deformed as indicated by a phantom line in FIG. 3B, and the head positioning accuracy of the apparatus becomes even further deteriorated.

FIG. 4 shows another example of the conventional pulley structure in which a pulley 15B is press-fit only partially on the motor shaft 16. In FIG. 4, L1 indicates a press-fit portion and L2 indicates a non-fit portion. The external form of the pulley 15B at the non-fit portion L2 is uneasily deformed, and for this reason, the belt 17 is wrapped on this non-fit portion L2.

According to the pulley 15B, it may not be possible to set a length a of the pulley 15B to a desired length due to space limitations within the apparatus. In this case, the belt 17 is inevitably wrapped around the pulley 15B at a portion exceeding the non-fit portion L2 and reaching the press-fit portion L1. Because the deformation occurs at the press-fit portion L1 at a low temperature similarly as in the case described before, the problems of the pulley 15A shown in FIGS. 3A and 3B are also introduced with the pulley 15B. Furthermore, since the length of the press-fit portion L1 is short, the pulley 15B easily vibrates at the non-fit portion L2.

FIG. 5 shows a conceivable pulley structure in which a narrow portion 16a is provided at an intermediate part of the motor shaft 16 and a pulley 15C is press-fit on the motor shaft 16 by avoiding contact with the motor shaft 16 at a central portion thereof. In other words, only the end portions of the pulley 15C are secured on the motor shaft 16 by the press-fitting. This pulley 15C will not easily vibrate at the end portion as in the case of the pulley 15B. However, the external form of the pulley 15C at press-fit portions 15Ca and 15Cb thereof becomes deformed at the low temperature, and in this case, the external form of the pulley 15C becomes irregular along a longitudinal direction thereof. Therefore, problems similar to those already described also occur according to the pulley 15C.

SUMMARY OF THE INVENTION

Accordingly, it is a general object of the present invention to provide a novel and useful pulley and pulley structure in which the problems described heretofore are eliminated.

Another and more specific object of the present invention is to provide a pulley adapted to be press-fit on a driving shaft, where projections having vertex portions with flat surfaces are formed on an inner peripheral surface defined by a center hole of the pulley. According to the pulley of the present invention, the flat surfaces of the projections make pressing contact with an outer peripheral surface of the driving shaft at a band-shaped contact area (or surface) extending spirally or concentrically along a longitudinal direction of the pulley. For this reason, a deformation of the pulley which occurs when the pulley is press-fit on the driving shaft and a deformation of the pulley which occurs due to thermal expansion and contraction can be absorbed by a deformation of the projections themselves. Thus, it is possible to prevent the external form of the pulley from becoming deformed.

Still another object of the present invention is to provide a pulley structure comprising a driving shaft, a pulley having a center hole defining an inner peripheral surface, and projections having vertex portions with flat surfaces formed on the inner peripheral surface. The pulley is press-fit on the driving shaft so that the flat surfaces of the projections make pressing contact with an outer peripheral surface of the driving shaft at a band-shaped contact area (or surface) extending spirally or concentrically along a longitudinal direction of the pulley. According to the pulley structure of the present invention, a deformation of the pulley which occurs when the pulley is press-fit on the driving shaft and a deformation of the pulley which occurs due to thermal expansion and contraction can be absorbed by a deformation of the projections themselves. Hence, it is possible to prevent the external form of the pulley from becoming deformed.

Other objects and further features of the present invention will be apparent from the following detailed description when read in conjunction with the accompanying drawings.

BRIEF DESCRIPTION OF THE DRAWINGS

FIGS. 9A through 9C respectively are cross sectional views for explaining production processes of the first embodiment of the pulley;

FIGS. 10 and 11 are cross sectional views on an enlarged scale showing an essential part of the pulley during the production processes shown in FIGS. 9B and 9C, respectively;

FIG. 12 is a cross sectional view for explaining a press-fitting of the first embodiment of the pulley on the motor shaft;

DETAILED DESCRIPTION

Figure 1:
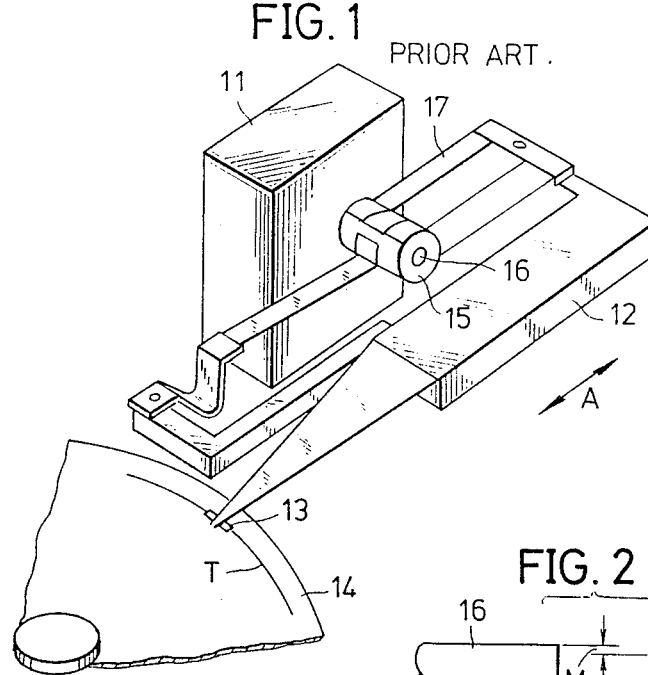
FIG. 1 is a perspective view showing an essential part of a magnetic disc recording and/or reproducing apparatus employing the conventional pulley structure.
Figure 2:
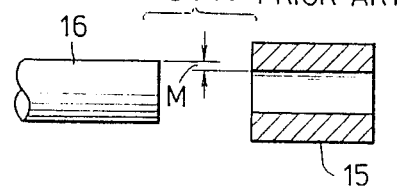
FIG. 2 is a cross sectional view for explaining a press-fitting of the conventional pulley on a motor shaft.
Figure 3A:
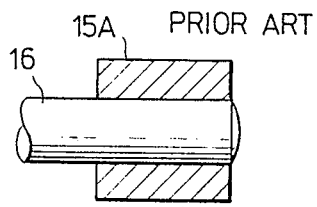
FIGS. 3A and 3B are a cross sectional view and a front view respectively showing an example of the conventional pulley structure.
Figure 3B:
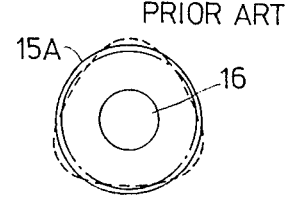
Figure 4:
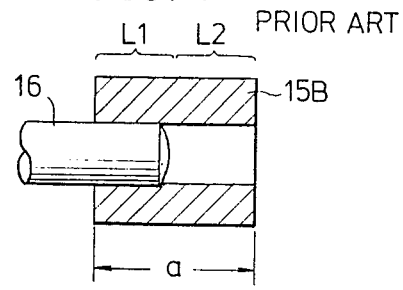
FIG. 4 is a cross sectional view showing another example of the conventional pulley structure.
Figure 5:
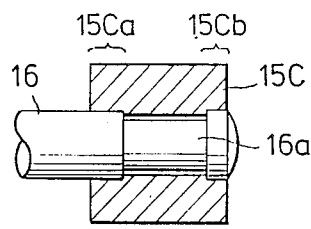
FIG. 5 is a cross sectional view showing a conceivable pulley structure.
Figure 6A:
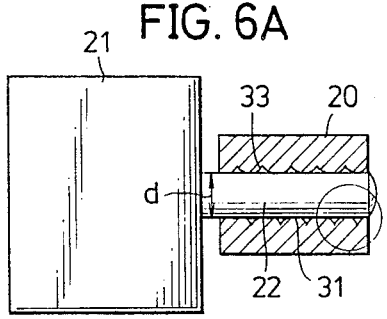
FIGS. 6A and 6B are a cross sectional view and a front view respectively showing a first embodiment of the pulley according to the present invention.
Figure 6B:
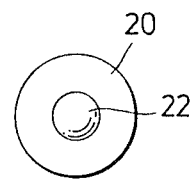
Figure 7:
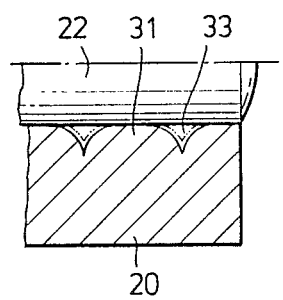
FIG. 7 is a cross sectional view showing a part of the first embodiment on an enlarged scale.
Figure 8:
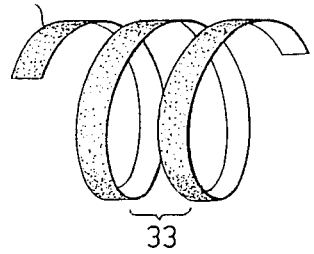
FIG. 8 is a perspective view showing a contact area between the pulley and the motor shaft in the first embodiment.

FIGS. 6A and 6B show a first embodiment of the pulley according to the present invention. In FIGS. 6A and 6B, a pulley 20 made of aluminum alloy, for example, is press-fit on a motor shaft 22 of a head seeking motor 21. The motor shaft 22 is made of stainless steel, for example. FIG. 7 shows a part of the pulley structure within a circle shown in FIG. 6A on an enlarged scale. FIG. 8 shows a contact area (or surface) between the pulley 20 and the motor shaft 22.

First, a description will be given on the construction of the pulley 20 by referring to production processes of the pulley 20. FIG. 9A shows a main pulley body 23. A diameter $d_1$ of a center hole 24 of the main pulley body 23 is considerably small compared to a diameter d of the motor shaft 22. Then, a thread is tapped in the center hole 24 of the main pulley body 23 with a predetermined pitch p as shown in FIG. 9B, so as to form a threaded portion 25 throughout the entire length of the main pulley body 23. FIG. 10 shows the shape of the threaded portion 25 on an enlarged scale. In FIG. 10, the threaded portion 25 comprises peaks 26 and troughs 27.

Next, as shown in FIG. 9C, tips 28 of the peaks 26 of the threaded portion 25 are cut off as shown in FIG. 11 and subjected to a finishing process, so that an internal diameter $d_2$ of the main pulley body 23 is the extra thickness greater than the diameter d of the motor shaft 22. FIG. 11 shows on an enlarged scale the shape of the main pulley body 23 after the finishing process. Thereafter, various processes are carried out with reference to the center hole 29, and the pulley 20 is completed.

As shown in FIG. 11, the center hole 29 of the completed pulley 20 defines an inner peripheral surface formed with a spiral projection 31. Each projection of the spiral projection 31 has an approximately trapezoidal cross section and a vertex portion with a flat portion 30 of a width W, and is formed with the predetermined pitch p. As will be described later in the present specification, troughs 32 form spaces for absorbing various deformations of the pulley 20.

The pulley 20 is press-fit on the motor shaft 22 in the direction of an arrow in FIG. 12 by spreading the spiral projection 31, until the fixed state shown in FIG. 6A is reached. The troughs 32 form spaces 33 between the inner peripheral surface of the pulley 20 at the center hole and the outer peripheral surface of the motor shaft 22. In addition, the pulley 20 and the motor shaft 22 make pressing contact at a spiral band-shaped contact area (surface) 34 as shown in FIG. 8, thereby ensuring a tight fit of the pulley 20 to the motor shaft 22. Furthermore, the spaces 33 are formed on both sides of the band-shaped contact area 34.

The deformation of the spiral projection 32 due to compression is absorbed by the spaces 33 as shown in FIG. 7. For this reason, the deformation of the spiral projection 32 due to the compression does not affect the outer portion of the pulley 20, and the external form of the pulley 20 maintains the perfect circular shape shown in FIG. 6B.

Accordingly, when the present embodiment is applied to the magnetic disc recording and/or reproducing apparatus, it is possible to obtain a satisfactory magnetic head positioning accuracy.

On the other hand, the pulley 20 and the motor shaft 22 undergo thermal expansion and contraction depending on the ambient temperature. Especially when the ambient temperature is lower than room temperature, the pulley 20 and the motor shaft 22 contract. In this case, the pulley 20 contracts more than the motor shaft 22 due to the difference in the respective coefficients of thermal expansion. But the extra contraction of the pulley 20 relative to the motor shaft 22 is absorbed by the spaces 33, because the spaces 33 allow the spiral projection 31 to deform within the spaces 33 as indicated by a two-dot chain line in FIG. 7. As a result, the deformation of the pulley 20 due to the thermal contraction is absorbed at the inner portion of the pulley 20 and does not affect the outer portion of the pulley 20, thereby maintaining the external form of the pulley 20 to the perfect circular shape shown in FIG. 6B. Therefore, when the present embodiment is applied to the magnetic disc recording and/or reproducing apparatus, it is also possible to effectively prevent the so-called thermal off-tracking. The thermal off-tracking is a kind of tracking error caused by thermal expansion and contraction of parts of the magnetic disc recording and/or reproducing apparatus.

It is possible to conceive an arrangement wherein the threaded pulley shown in FIG. 9B is simply press-fit on the motor shaft 22. However, in this case, a contact area (surface) between the pulley and the motor shaft 22 becomes small. In other words, the width of the spiral band-shaped contact area becomes narrow. Consequently, it is impossible to obtain a tight fitting between the pulley and the motor shaft 22, and an erroneous centering of the pulley easily occurs because of the insufficient contact pressure. On the other hand, according to the embodiment, the vertex portions of the spiral projection 31 are formed as the flat surfaces 30 so that the pulley 20 is press-fit on the motor shaft 22 with a desired rigidity (contact pressure) to ensure stable vibration-free rotation of the pulley 20.

In FIG. 11, the values D, H, and W can be selected to arbitrarily adjust the contact pressure and deformation absorbing quantity, where the deformation absorbing quantity is the amount of deformation that can be absorbed, D denotes a distance between two mutually adjacent vertex portions (or a maximum width of the trough 32) and H denotes a height of the projection of the spiral projection 31. For example, when the width W is set to a small value and the distance D and the height H are set to large values, the contact pressure becomes small and the deformation absorbing quantity becomes large. On the other hand, when the width W is set to a large value and the distance D and the height H are set to small values, the contact pressure becomes large and the deformation absorbing quantity becomes small. Accordingly, by setting the ratios of the width W, the distance D and the height H by taking into account the material used for the pulley 20, it is possible to obtain a desired contact pressure in a state where the deformation can be absorbed by the spiral projection 31 itself.

Figure 13:
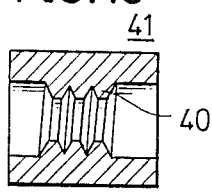
FIGS. 13 through 15 are cross sectional views showing first through third modifications of the first embodiment, respectively.
Figure 14:
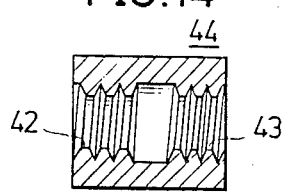
Figure 15:
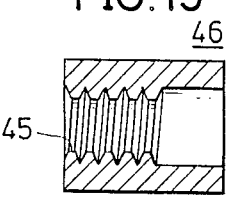

FIGS. 13, 14 and 15 show first, second and third modifications of the first embodiment, respectively. Each of these first through third modifications have the spiral projection provided in a portion of the pulley. In FIG. 13, a pulley 41 has a spiral projection 40 formed on only a central portion of an inner peripheral surface which is defined by a center hole of the pulley 41. In FIG. 14, a pulley 44 has spiral projections 42 and 43 formed on both end portions of an inner peripheral surface which is defined by a center hole of the pulley 44. In FIG. 15, a pulley 46 has a spiral projection 45 formed on only a first half portion of an inner peripheral surface which is defined by a center hole of the pulley 46. Each of the pulleys 41, 44 and 46 are press-fit on the motor shaft 22 similarly as in the case of the pulley 20 described before.

Figure 16:
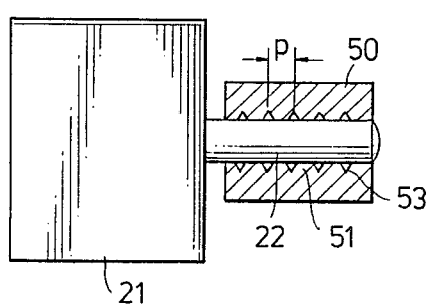
FIG. 16 is a cross sectional view showing a second embodiment of the pulley according to the present invention.
Figure 17:
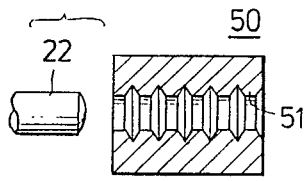
FIG. 17 is a cross sectional view for explaining a press-fitting of the second embodiment of the pulley on the motor shaft.
Figure 18:
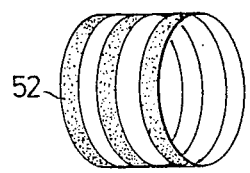
FIG. 18 is a perspective view showing a contact area between the pulley and the motor shaft in the second embodiment.

FIG. 16 shows a second embodiment of the pulley according to the present invention. In FIG. 16, those parts which are the same as those corresponding parts in FIG. 6A are designated by the same reference numerals, and a description thereof will be omitted. A pulley 50 is press-fit on the motor shaft 22. The pulley 50 has an inner peripheral surface which is defined by a center hole and a plurality of concentric ring-shaped projections 51 having an approximately trapezoidal cross section are formed on the inner peripheral surface as shown in FIG. 17. These ring-shaped projections 51 are formed with the predetermined pitch p. As shown in FIG. 18, the pulley 50 and the motor shaft 22 make pressing contact at concentric band-shaped contact areas (surfaces) 52, thereby ensuring a tight fitting of the pulley 50 to the motor shaft 22. Furthermore, spaces 53 are formed on both sides of each of the band-shaped contact areas 52.

According to the present embodiment, it is possible to obtain effects similar to those obtainable in the first embodiment described before.

It is of course possible to make modifications of the second embodiment similarly to the first through third modifications of the first embodiment. However, illustration and description thereof will be omitted because such modifications of the second embodiment will be substantially the same as those shown in FIGS. 13 through 15.

In each of the described embodiments, the shaft on which the pulley is press-fit is not limited to the motor shaft, and may be any kind of a driving shaft.

In addition, the application of the present invention is not limited to the pulley employed in the magnetic disc recording and/or reproducing apparatus. For example, the present invention is also applicable to a magnetic tape recording and/or reproducing apparatus such as a tape recorder which employs a capstan press-fit on a capstan shaft.

Further, the present invention is not limited to these embodiments, but various variations and modifications may be made without departing from the scope of the present invention.

What is claimed is:

1. A pulley adapted to be press-fit on a driving shaft, said pulley comprising:
a main pulley body having a center hole for receiving the driving shaft, said center hole having a predetermined length and a predetermined diameter that is smaller than a diameter of said driving shaft;
an inner peripheral surface defined by said center hole; and
a plurality of projections spirally or concentrically projecting from said inner peripheral surface with a predetermined pitch,
said projections each having a vertex portion with a flat surface,
said predetermined pitch of said projections being substantially smaller than the predetermined length of said center hole so that a sufficient number of troughs are formed between said projections to absorb deformations of said projections caused by press-fitting the pulley on said driving shaft.

2. A pulley as claimed in claim 1 in which said projections are formed on said inner peripheral surface for an entire length along a longitudinal direction of said main pulley body.

3. A pulley as claimed in claim 1 in which said projections are formed on a portion of said inner peripheral surface along a longitudinal direction of said main pulley body.

4. A pulley as claimed in claim 1 in which said projections have an approximately trapezoidal cross section.

5. A pulley structure comprising:
a driving shaft;
a pulley having a center hole into which said driving shaft fits, said center hole defining an inner peripheral surface of said pulley, said center hole having a predetermined length and a predetermined diameter that is smaller than a diameter of said driving shaft; and
a plurality of projections spirally or concentrically projecting from said inner peripheral surface with a predetermined pitch,
said projections having vertex portions with flat surfaces,
said pulley being press-fit on said driving shaft so that the flat surfaces of the vertex portions of said projections make pressing contact with an outer peripheral surface of said driving shaft,
said predetermined pitch of said projections being substantially smaller than the predetermined length of said center hole so that a sufficient number of troughs are formed between said projections to absorb deformations of said projections caused by press-fitting the pulley on said driving shaft.

6. A pulley structure as claimed in claim 5 in which said projections are formed on said inner peripheral surface for an entire length along a longitudinal direction of said pulley.

7. A pulley structure as claimed in claim 5 in which said projections are formed on a portion of said inner peripheral surface along a longitudinal direction of said pulley.

8. A pulley structure as claimed in claim 5 in which said projections have an approximately trapezoidal cross section.

9. A pulley structure as claimed in claim 5 in which said driving shaft and said pulley are made of materials having mutually different coefficients of thermal expansion, and said troughs formed between said projections absorb deformations of said projections caused by difference between thermal expansions and contractions of said driving shaft and said pulley.

10. A pulley structure as claimed in claim 9 in which said projections have an approximately trapezoidal cross section.

* * * * *